US008677892B2

(12) United States Patent
Misawa et al.

(10) Patent No.: US 8,677,892 B2
(45) Date of Patent: Mar. 25, 2014

(54) METHOD AND APPARATUS FOR CONTROLLING MICROORGANISMS IN FOOD MATERIALS BY VACUUM AND RESONANT ULTRASONICATION

(75) Inventors: Naoki Misawa, Miyazaki (JP);
Junichiro Soejima, Tokyo (JP);
Katsuhiro Koyama, Tokyo (JP)

(73) Assignees: University of Miyazaki, Miyazaki-shi (JP); Kaijo Corporation, Tokyo (JP)

( * ) Notice: Subject to any disclaimer, the term of this patent is extended or adjusted under 35 U.S.C. 154(b) by 193 days.

(21) Appl. No.: 13/262,511

(22) PCT Filed: Mar. 18, 2011

(86) PCT No.: PCT/JP2011/057490
§ 371 (c)(1),
(2), (4) Date: Sep. 30, 2011

(87) PCT Pub. No.: WO2011/118821
PCT Pub. Date: Sep. 29, 2011

(65) Prior Publication Data
US 2012/0027898 A1   Feb. 2, 2012

(30) Foreign Application Priority Data

Mar. 23, 2010  (JP) ................. 2010-065744

(51) Int. Cl.
*A23C 3/07* (2006.01)
*B08B 3/00* (2006.01)
*A61N 5/00* (2006.01)

(52) U.S. Cl.
USPC ........................ 99/451; 134/198; 250/492.1

(58) Field of Classification Search
USPC .............. 422/20, 127–128; 134/25.3, 1, 198; 250/492.1; 99/451; 426/234–236, 238
See application file for complete search history.

(56) References Cited

U.S. PATENT DOCUMENTS

| 6,090,346 A | 7/2000 | Rose et al. |
| 2003/0091703 A1 | 5/2003 | Kuwa et al. |
| 2003/0108648 A1 | 6/2003 | Ming et al. |

(Continued)

FOREIGN PATENT DOCUMENTS

| JP | 5-146263 A | 6/1993 |
| JP | 07-328316 A | 12/1995 |

(Continued)

OTHER PUBLICATIONS

H. Tsuji et al., "Cho Onpa Senjo-yo Hasshinki" Shimada Rika Giho (Technical Report, SPC Electronics Corporation), 2007, No. 19, pp. 47-50, cited in ISR.

(Continued)

*Primary Examiner* — Monzer R Chorbaji
(74) *Attorney, Agent, or Firm* — Westerman, Hattori, Daniels & Adrian, LLP

(57) ABSTRACT

An object of the present invention is to provide a method for controlling microorganisms in food materials, by which bacterial groups that cause deterioration of the quality of food materials such as poultry and pathogenic microorganisms that cause food poisoning can be efficiently controlled. Specifically, the present invention relates to a method for controlling microorganisms in food materials, comprising a step of subjecting a food material immersed in a sterilizing solution to repeated treatment with negative pressure and ordinary pressure and/or a step of subjecting the food material immersed in the sterilizing solution to resonant ultrasonication.

6 Claims, 15 Drawing Sheets

(56) References Cited

U.S. PATENT DOCUMENTS

| | | |
|---|---|---|
| 2006/0110503 A1* | 5/2006 | Bates et al. .................. 426/238 |
| 2006/0283328 A1 | 12/2006 | Saiki et al. |
| 2007/0020364 A1 | 1/2007 | Burnett et al. |

FOREIGN PATENT DOCUMENTS

| | | |
|---|---|---|
| JP | 2000-116313 A | 4/2000 |
| JP | 2001-238612 A | 9/2001 |
| JP | 2001-526941 A | 12/2001 |
| JP | 2005-526480 A | 9/2005 |
| JP | 2007-029944 A | 2/2007 |
| JP | 2009-502918 A | 1/2009 |
| JP | 2009-506771 A | 2/2009 |
| JP | 2009-189279 A | 8/2009 |
| JP | 2010-046570 A | 3/2010 |
| WO | 99/33495 A | 7/1999 |
| WO | 03/005963 A2 | 1/2003 |
| WO | 2007/018923 A2 | 2/2007 |
| WO | 2007/030104 A1 | 3/2007 |
| WO | 2009-135273 A1 | 11/2009 |

OTHER PUBLICATIONS

N. Misawa et al., "Cho Onpa o Riyo shita Campylobacter Gekitai Gijutsu", Ultrasonic Technology, Jul. 2010, vol. 22, pp. 6-9, cited in ISR.

T. Araki et al., "Niwatori to Karada no Campylobacter Seigyo Gijutsu no Kaihatsu", Japanese Society of Veterinary Science, Sep. 2010, vol. 150, p. 258, cited in ISR.

International Search Report of PCT/JP2011/057490, mailing date Apr. 19, 2011.

Written Opinion of the IPEA dated Oct. 5, 2011, issued in Application No. PCT/JP2011/057490.

* cited by examiner

Fig. 4
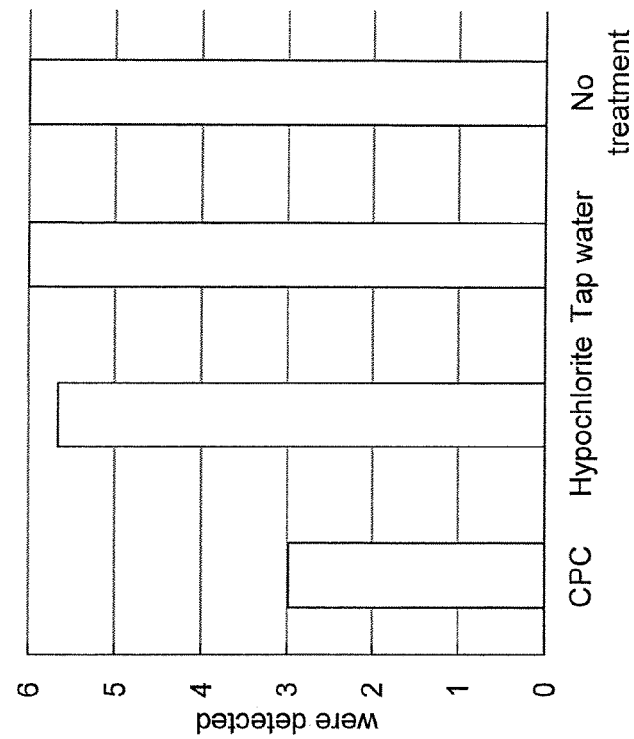
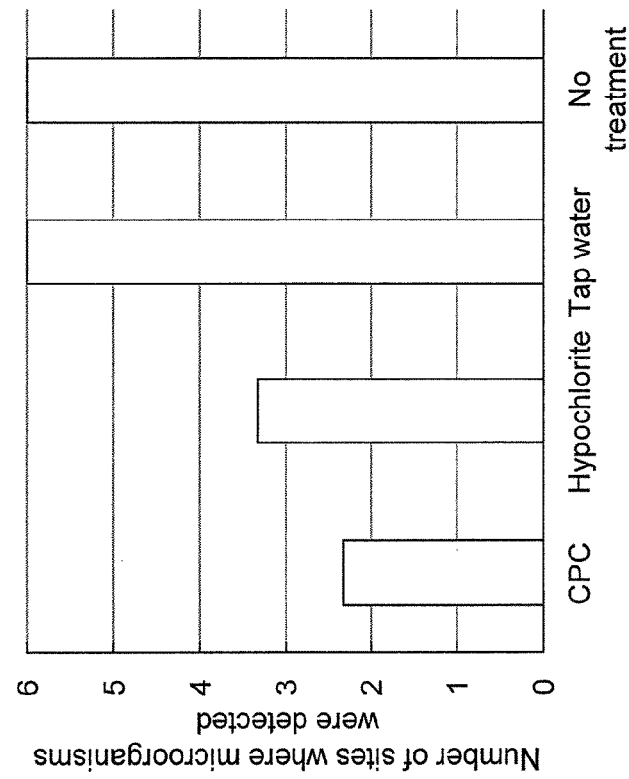

Fig. 6
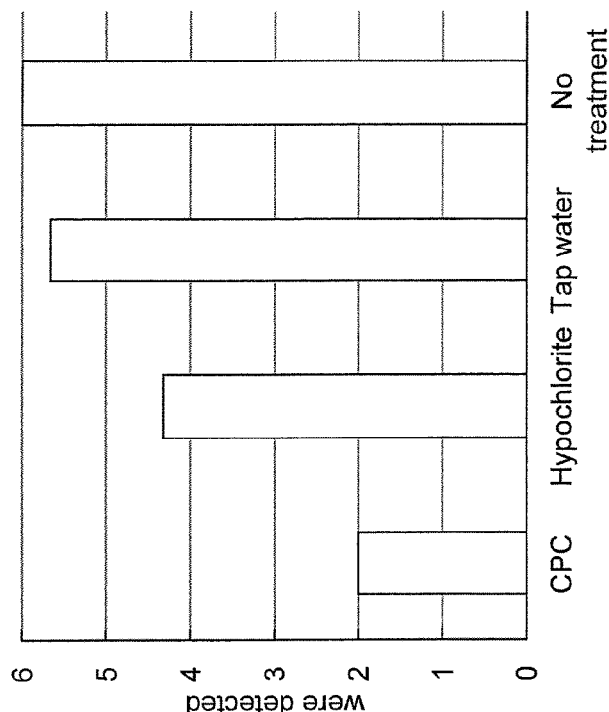
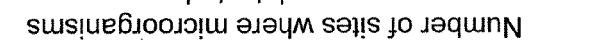
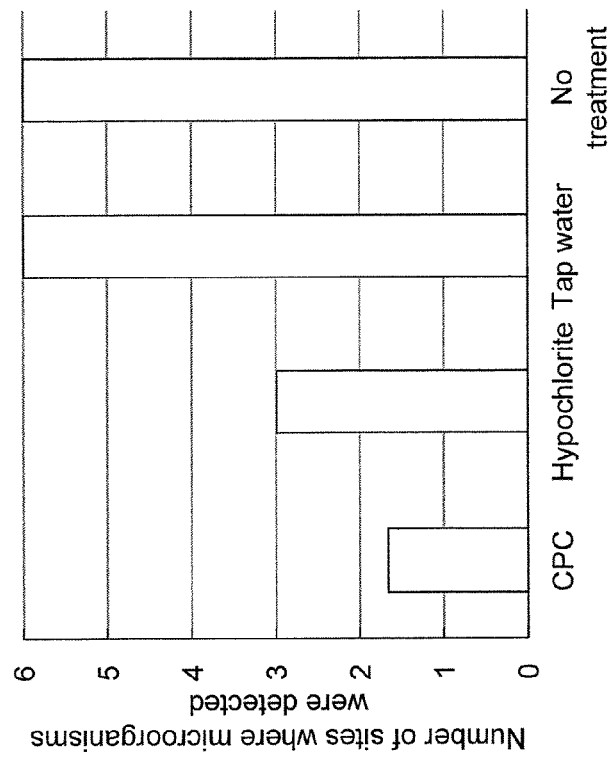

METHOD AND APPARATUS FOR CONTROLLING MICROORGANISMS IN FOOD MATERIALS BY VACUUM AND RESONANT ULTRASONICATION

TECHNICAL FIELD

The present invention relates to, for example, a method and an apparatus for controlling microorganisms in food materials such as poultry.

BACKGROUND ART

Among meat, poultry is processed and sold with the skin, unlike beef or pork. Hence, the number of adherent bacteria (adherent bacterial count) that decrease the freshness of the meat is high in the case of poultry. Moreover, it is difficult to control contaminating microorganisms that enter wounds on the poultry skin surface or feather follicles through processing steps. Therefore, the shelf life of consumption determined for poultry is often much shorter than those for other types of meat. The number of bacteria adhering to the poultry skin surface varies slightly depending on season or the "carcass" site. In general, about 10,000 to 100,000 cells are detected per 25 square centimeters (general viable cell count). Furthermore, about 70% of domestic commercial chicken meat is contaminated with *Campylobacter* (*Campylobacter* accounts for the highest number of incidents of food poisoning in Japan), as revealed by research results. Thus, there is an urgent need to develop measures for the control of *Campylobacter*.

Agents such as hypochlorite have been used for controlling pathogenic microorganisms in slaughterhouses. However, such agents are problematic due to their low effects of sterilizing contaminating microorganisms adhering to meat. For example, at large-scale poultry slaughterhouses, "carcasses" are immersed for about 40 minutes in about 100-ppm hypochlorite water during a chilling process, but a large number of bacteria continue to adhere to the skin surfaces even after the treatment. Effective sterilization treatment has been difficult.

Meanwhile, ozone is used as disinfectant as an alternative for hypochlorite or the like. Ozone has nearly 10 times the sterilizing ability of a chlorine disinfectant, but is problematic in that if ozonated water is produced, most of ozone disappears within a short time because of dissipation or degradation thereof. Ozone is also problematic in that in the presence of an organic matter the sterilizing effects of ozone are lowered. Also, ozone gas is toxic, so that the use thereof requires a closed-system treatment apparatus.

Patent document 1 discloses a method and an apparatus for washing broilers and the like. The washing method involves immersing chicken meat with its skin in electrolyzed alkaline or oxidizing water and then performing ultrasonication. However, the washing method disclosed in Patent document 1 is problematic in that since air enters feather follicles or wounds on the chicken skin surface during the defeathering step for processing poultry, a disinfectant cannot sufficiently infiltrate chicken meat with its skin even when the chicken meat is immersed in the agent. Moreover, the effectiveness of the apparatus disclosed in patent document 1 for sterilizing microorganisms causing food poisoning when broilers are washed using the apparatus remains unknown.

Patent document 2 discloses a method for controlling microorganisms in food materials. The method involves an ultrasonication step for irradiating an aqueous solution in which food materials such as chicken meat are immersed with ultrasonic waves and a step for treatment with ozone-containing microbubbles, by which ultrasonicated food materials are immersed in an aqueous solution prepared by generating ozone-containing microbubbles.

PRIOR ART DOCUMENTS

Patent Documents

Patent document 1 JP Patent Publication (Kokai) No. 2000-116313 A
Patent document 2 JP Patent Publication (Kokai) No. 2009-1 892 79 A

SUMMARY OF THE INVENTION

Methods for controlling microorganisms in food materials such as edible chicken meat have been conventionally known, as described above. An even more improved method for controlling microorganisms in food materials is desired.

In view of the above circumstances, an object of the present invention is to provide a method and an apparatus for controlling microorganisms in food materials that are capable of efficiently controlling bacterial groups that cause deterioration of the quality of food materials such as poultry or pathogenic microorganisms that cause food poisoning.

As a result of intensive studies to achieve the above object, the present inventors have found that more effective sterilization of food materials becomes possible by subjecting food materials such as edible chicken meat immersed in a sterilizing solution to repeated treatment with negative pressure and ordinary pressure and/or subjecting the same to resonant ultrasonication. Thus the present inventors have completed the present invention.

The present invention encompasses the following (1) to (20).

(1) A method for controlling microorganisms in a food material, comprising a step of subjecting a food material immersed in a sterilizing solution to repeated treatment with negative pressure and ordinary pressure and/or a step of subjecting a food material immersed in a sterilizing solution to resonant ultrasonication.

(2) The method according to (1), comprising performing the step of subjecting a food material immersed in a sterilizing solution to resonant ultrasonication, after or simultaneously with the step of subjecting the food material immersed in the sterilizing solution to repeated treatment with negative pressure and ordinary pressure.

(3) The method according to (1) or (2), wherein the food material immersed in the sterilizing solution is subjected to resonant ultrasonication while the food material is rotated.

(4) The method according to any one of (1) to (3), wherein treatment with negative pressure is performed by suction at 0.002 MPa to 0.06 MPa.

(5) The method according to any one of (1) to (4), wherein the number of repetitions of treatment with negative pressure and ordinary pressure ranges from 1 to 5.

(6) The method according to any one of (1) to (5), wherein resonant ultrasonication is performed by irradiation with resonant ultrasonic waves having a frequency ranging from 28 KHz to 130 KHz.

(7) The method according to any one of (1) to (6), wherein the sterilizing solution is a cetylpyridinium chloride (CPC) solution.

(8) The method according to (7), wherein the concentration of cetylpyridinium chloride in the sterilizing solution ranges from 500 ppm to 2000 ppm.

(9) The method according to any one of (1) to (6), wherein the sterilizing solution is a solution containing sodium lactate, ethanol, calcium hydroxide, lactic acid, and carboxymethylcellulose sodium.

(10) The method according to any one of (1) to (9), wherein the food material is meat.

(11) The method according to (10), wherein the meat is poultry.

(12) An apparatus for controlling microorganisms in a food material, comprising a means for subjecting a food material immersed in a sterilizing solution to repeated treatment with negative pressure and ordinary pressure and a means for treating the food material with resonant ultrasonic waves.

(13) The apparatus according to (12), further comprising a means for subjecting the food material immersed in the sterilizing solution to rotation treatment.

(14) The apparatus according to (12) or (13), wherein resonant ultrasonication is performed by irradiation with resonant ultrasonic waves having a frequency ranging from 28 KHz to 130 KHz.

(15) An apparatus for controlling microorganisms in a food material, comprising at least one treatment tank for subjecting a food material immersed in a sterilizing solution to treatment, an indirect tank in which a treatment tank is disposed, a dissolved-gas-controlling means for controlling dissolved gases in solutions within the treatment tank and the indirect tank, and a means for subjecting the food material immersed in the sterilizing solution to resonant ultrasonication, wherein the food material is subjected to resonant ultrasonication under control of dissolved gases using the dissolved-gas-controlling means.

(16) The apparatus according to (15) comprising a reduced-pressure-controlling means, wherein the food material is subjected to repeated treatment with negative pressure and ordinary pressure.

(17) The apparatus according to (15) or (16), further comprising a means for subjecting the food material immersed in the sterilizing solution to rotation treatment, wherein the food material is subjected to resonant ultrasonication while the food material is rotated.

(18) The apparatus according to any one of (12) to (17), comprising a means for controlling the output of ultrasonic waves.

(19) The apparatus according to any one of (12) to (18), wherein the food material is meat.

(20) The apparatus according to (19), wherein the meat is poultry.

This description hereby incorporates the entire content of the description and/or the drawings of Japanese Patent Application No. 2010-065744, which is the basis of the priority claim of this application.

BRIEF DESCRIPTION OF THE DRAWINGS

FIG. 4 shows graphs showing the results of a qualitative test concerning the effects of sterilization treatment methods and disinfectants used herein on the effect of sterilizing *Campylobacter* in broilers (A: combination of suction treatment—resonant ultrasonic waves; B: use of resonant ultrasonic waves alone).

FIG. 6 shows graphs showing the results of a qualitative test concerning the effects of sterilization treatment methods and disinfectants used herein on the effect of sterilizing *Campylobacter* in broilers (A: combination of suction treatment resonant ultrasonic waves; B: use of resonant ultrasonic waves alone).

BEST MODES FOR CARRYING OUT THE INVENTION

Figure 1:
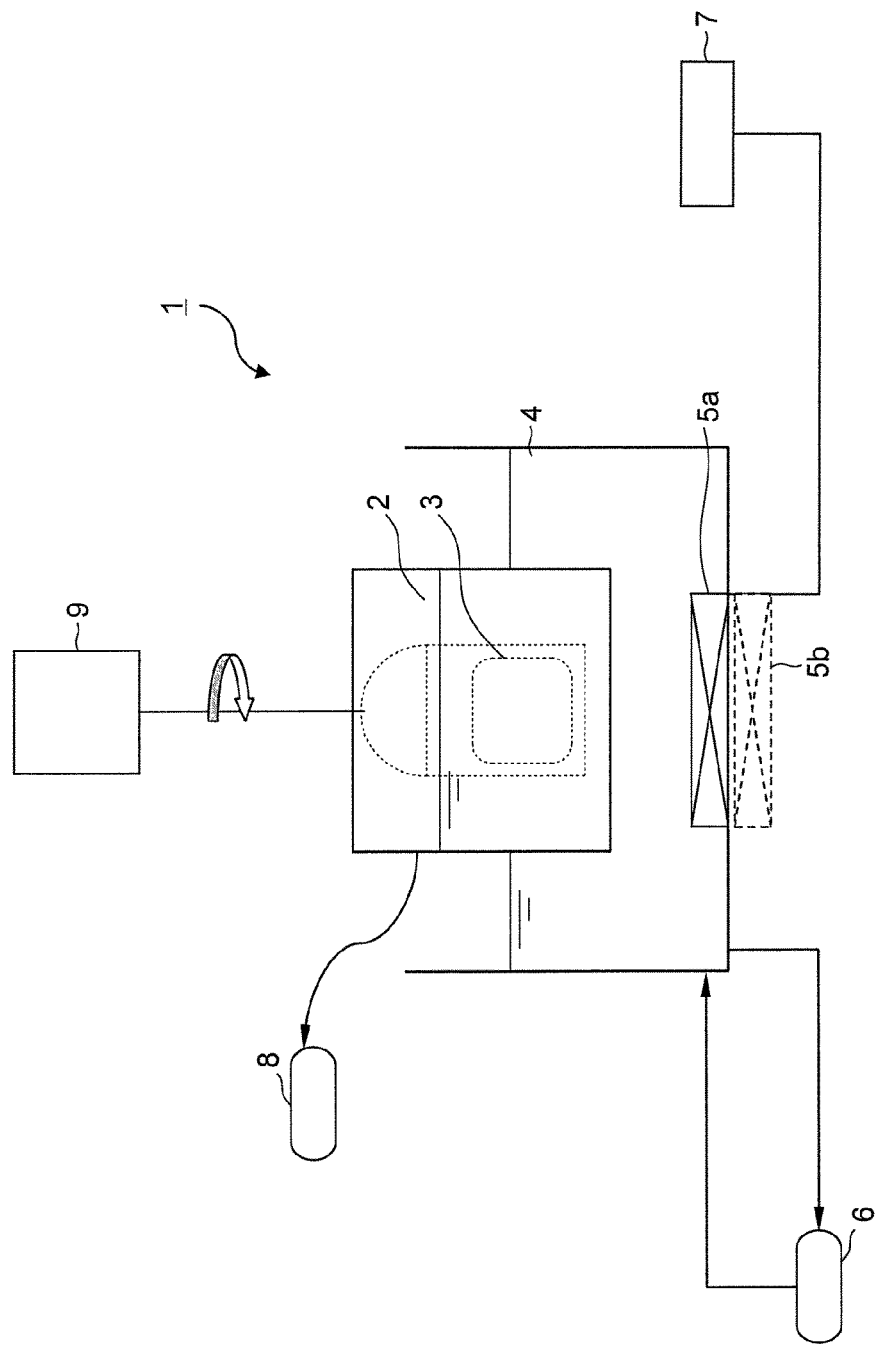
FIG. 1 is a schematic diagram showing the basic concept behind the apparatus for controlling microorganisms according to the present invention.

Hereafter, the present invention is described in detail.

The method for controlling microorganisms in a food material according to the present invention (hereinafter, referred to as "the method") is a method for controlling microorganisms adhering to a food material by subjecting the food material immersed in a sterilizing solution to resonant ultrasonication.

Here, the term "resonant ultrasonication" refers to ultrasonication that involves removing dissolved gases in a solution, which interfere with ultrasonic waves, in a dissolved gas control unit, so as to spread ultrasonic waves throughout the tank while allowing dissolved gases effective for the physical effects (cavitation) of ultrasonic waves to remain. Specifically, unlike general ultrasonication, resonant ultrasonication has an effect of spreading ultrasonic waves (used for irradiation) throughout all the five surfaces within the tank, as well as an effect of accelerating the physical effects of ultrasonic waves through the control of dissolved gases in a solution by a dissolved gas control unit. Ultrasonication as disclosed in patent document 2 has a washing effect, but has a property of proceeding in only a single direction. Hence, ultrasonication of patent document 2 is problematic in that a steric object such as the "carcass" of poultry cannot be exposed uniformly to ultrasonic waves. On the other hand, resonant ultrasonic waves can be applied not only from a single direction, but also from all angles, so that even an object in a poultry "carcass"-like shape can be uniformly irradiated with ultrasonic waves. Also, more effectively, the effects of the irradiation with resonant ultrasonic waves can be even increased by rotating such a poultry "carcass" using a drum rotating tank or the like. Therefore, resonant ultrasonication is performed after sufficient infiltration of a food material with a disinfectant, so that the liberation of bacteria adhering to the food material such as the skin surface of a poultry "carcass" is accelerated and thus adherent bacteria can be efficiently sterilized. Moreover, resonant ultrasonic waves have the oscillation energy to be applied to the surface of a food material such as chicken skin which is stronger than that of a case where no resonance system is used in combination.

Meanwhile, the term "controlling microorganisms" refers to the reduction or the removal of microorganisms adhering to a food material through sterilization or bacteriostasis of the microorganisms. Examples of microorganisms to be controlled by the method include bacteria of the genus *Salmonella*, bacteria of the genus *Campylobacter*, enterohemorrhagic *Escherichia coli*, *Vibrio parahaemolyticus*, *Bacillus subtilis*, *Bacillus cercus*, coliforms, and psychrotrophic bacteria.

Also, examples of a food material to be subjected to treatment by the method include meat and particularly poultry such as the carcasses of birds (e.g., chickens such as broilers and local chickens).

In the method, a food material is immersed in a sterilizing solution and then subjected to resonant ultrasonication. Examples of a sterilizing solution include a cetylpyridinium chloride solution and a hypochlorite solution. In particular, a cetylpyridinium chloride solution approved as a quasi drug and having surfactant effects is preferred. When a cetylpyridinium chloride solution is used, the concentration of cetylpyridinium chloride in a sterilizing solution ranges from 500 ppm to 2000 ppm, for example, and particularly preferably ranges from 1000 ppm to 1500 ppm. On the other hand, when a hypochlorite solution is used, the concentration of hypochlorite in a sterilizing solution ranges from 50 ppm to 200 ppm, for example, and particularly preferably ranges from 100 ppm to 150 ppm. Furthermore, as a sterilizing solution, a solution containing sodium lactate, ethanol, calcium hydroxide, lactic acid, and carboxymethylcellulose sodium can be used. An example of such a solution is Kitchen Staff Kinkorosu Water (registered trademark) (for immersion) (Kawakami Co., Ltd.) (hereinafter, simply referred to as "Kinkorosu Water solution"). Kinkorosu Water solution contains sodium lactate, ethanol, calcium hydroxide, lactic acid, carboxymethylcellulose sodium, and water at the following concentrations: sodium lactate (60%): 9.9%, ethanol: 19.7%, calcium hydroxide: 12.8%, lactic acid: 0.01%, carboxymethylcellulose sodium: 0.02%, and water: 57.57%. In the method, Kinkorosu Water solution with a concentration ranging from 1% to 4% (e.g., about 4%) can be used as a sterilizing solution, for example.

Resonant ultrasonication is performed for 1 to 10 minutes (preferably 2 to 5 minutes) of irradiation with resonant ultrasonic waves having a frequency ranging from 28 KHz to 130 KHz (and preferably 78 KHz to 130 KHz), for example. Alternatively, when a food material is a chicken carcass such as a broiler or a local chicken carcass, the carcass can be subjected to up to 5 minutes of resonant ultrasonication while left to stand or a maximum of 15 minutes of resonant ultrasonication while being rotated. Also, the temperature of the sterilizing solution during resonant ultrasonication preferably ranges from 20° C. to 30° C. In the method, water in which a disinfectant is dissolved (e.g., cetylpyridinium chloride, hypochlorite, or Kinkorosu Water solution) is preferably water in which the concentration of dissolved oxygen is regulated between 2.5 mg/l and 3.5 mg/l, for example, by a dissolved-gas-controlling means described below (and the concentration of dissolved oxygen in general tap water is about 8 mg/l). Also, resonant ultrasonication of a food material immersed in a sterilizing solution is performed while the food material is rotated, so that topical temperature increase of a food material such as meat due to cavitation (described below) during resonant ultrasonication can be prevented and the time for irradiation with resonant ultrasonic waves can be prolonged. The thus prolonged time for irradiation with resonant ultrasonic waves can improve sterilization effects. Rotation treatment for a food material such as meat is performed at 30 rotations per minute, for example.

In this method, before resonant ultrasonication, a food material immersed in a sterilizing solution is preferably subjected to repeated treatment with negative pressure and ordinary pressure (about 1 atmospheric pressure). Also, in the method, the step of the repeated treatment with negative pressure and ordinary pressure and the step of resonant ultrasonication may be performed simultaneously in order to shorten the time required for microbial control treatment for the food material. A reason of difficulties in control of microbial contamination during a poultry processing step is that since an agent does not infiltrate wounds on the skin surface or feather follicles through immersion alone of a chicken carcass in a disinfectant, sufficient sterilizing effects cannot be expected. In the method, the deaeration of poultry (food material) immersed in a sterilizing solution via suction and the recovery of ordinary pressure are repeated, so that sufficient infiltration with the sterilizing solution becomes possible and specifically, effective sterilization of bacteria existing in follicles or wounds of the poultry skin becomes possible, for example.

Alternatively, in the method, effective sterilization of a food material such as local chicken meat is possible only by subjecting the food material immersed in a sterilizing solution to repeated treatment with negative pressure and ordinary pressure.

Treatment with negative pressure is performed by suction at 0.002 MPa to 0.06 MPa (and preferably 0.002 MPa to 0.005 MPa), for example. Also, for example, the time for suction is determined to range from 5 minutes to 20 minutes (and preferably 5 to 10 minutes) and the time for treatment with ordinary pressure is determined to range from 0 to 5 minutes (and preferably 1 to 2 minutes). Moreover, the number of repetitions of treatment with negative pressure and ordinary pressure ranges from 1 to 5 and preferably ranges from 1 to 3, for example.

In the method, after repeated treatment with negative pressure and ordinary pressure or resonant ultrasonication, the food material may be washed with running tap water and then the sterilizing solution may be removed.

According to the above described method, microorganisms adhering to food materials can be controlled via sufficient sterilization or bacteriostasis.

Meanwhile, the apparatus for controlling microorganisms in a food material according to the present invention (hereinafter, referred to as "the apparatus") is capable of performing the above described method. The apparatus may have a means for subjecting a food material immersed in a sterilizing solution to repeated treatment with negative pressure and ordinary pressure and a means for treating the food material with resonant ultrasonic waves. The method is performed by the means for treatment with resonant ultrasonic waves. Specifically, resonant ultrasonication is performed by irradiation with resonant ultrasonic waves having a frequency ranging from 28 KHz to 130 KHz (preferably, 78 KHz to 130 KHz), for example.

FIG. 1 is a schematic diagram showing the basic concept of the apparatus.

As shown in FIG. 1, the apparatus 1 comprises a treatment tank 2 for accommodating a food material 3, an indirect tank 4 in which the treatment tank 2 and an ultrasonic transducer 5a are disposed, and a dissolved-gas-controlling means (dissolved gas control unit) 6 for controlling dissolved gases in a solution. The apparatus 1 also comprises an ultrasonic generator 7 for applying ultrasonic waves via the ultrasonic transducer 5a (i.e., the ultrasonic transducer and the ultrasonic generator are means for subjecting a food material immersed in a sterilizing solution to resonant ultrasonication). Furthermore, in the apparatus 1, a reduced-pressure-controlling means 8 for subjecting the food material 3 to repeated treatment with negative pressure and ordinary pressure can be connected to the treatment tank 2. Also, in the apparatus 1, a means 9 (hereinafter, referred to as "rotation treatment means") for subjecting a food material immersed in a sterilizing solution to rotation treatment can be connected to the food material 3 (i.e., a container in which the food material is placed).

Here, the term "dissolved-gas-controlling means" refers to a means for controlling the concentration of dissolved gases in a solution by causing cavitation (the phenomenon of bubbling (bubble formation) from dissolved gases (dissolved air) via rapid pressure change) to take place, so as to cause bubble formation from dissolved gases in the solution. Cavitation takes place when the cross-section of a pathway is rapidly made smaller to cause pressure loss, for example. The dissolved-gas-controlling means connected at a position along the solution circulation path is used. The solution is circulated by a circulating pump, dissolved gases in the solution flowing through the solution circulation path are bubbled by cavitation caused by the dissolved-gas-controlling means, and dissolved gas bubbles are circulated together with the solution to the tank. Relatively large dissolved gas bubbles are discharged to the outside of the tank from the solution surface in the tank because of buoyancy. As a result, the concentration of dissolved gases in the solution is controlled.

Dissolved gas control requires a large amount of dissolved gas in original water. In general, tap water contains about 8 ppm of oxygen and about 20 ppm of nitrogen at 25° C. When water for which no dissolved gas control is performed is irradiated with ultrasonic waves, the flow of bubbles is stagnated where sound pressure change is insignificant. When the flow of bubbles is stagnated, the transmission of ultrasonic waves is inhibited. Forced removal of bubbles requires the constant replacement of water with new water containing a low amount of bubbles, although the amount of water consumed increases. If the bubble sizes are further increased by circulation and the subsequent pressure loss without replacement with any new solution, an adequate gas quantity is achieved because of the buoyancy of bubbles, and water consumption can be reduced economically.

In the apparatus 1, the food material 3 immersed in a sterilizing solution within the treatment tank 2 is subjected to repeated treatment with negative pressure and ordinary pressure using the reduced-pressure-controlling means 8, and/or it is subjected to resonant ultrasonication by the ultrasonic transducer 5a disposed within the indirect tank 4 via an ultrasonic generator 7. Resonant ultrasonic waves irradiated within the indirect tank 4 are transmitted through the walls of the treatment tank 2, and thus the food material 3 is also irradiated with the resonant ultrasonic waves. Also, the dissolved-gas-controlling means 6 controls dissolved gases in the solution within the indirect tank 4, so as to result in oscillation producing stable resonant ultrasonic waves. Moreover, the rotation treatment means 9 can subject the food material 3 to resonant ultrasonication while the food material 3 is rotated.

Figure 2:
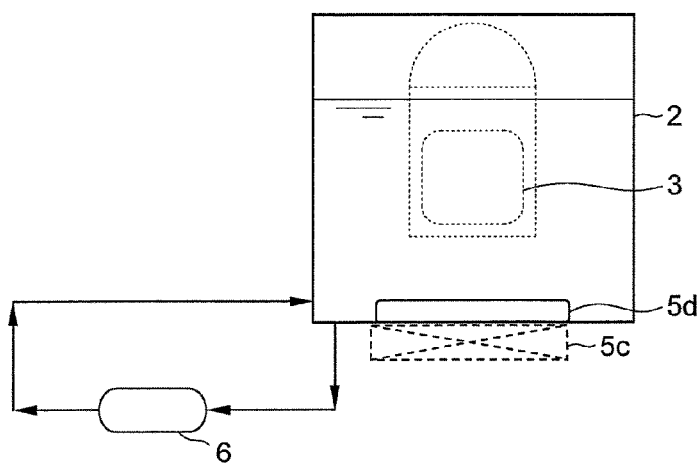
FIG. 2 is a schematic diagram showing an example of the arrangement of an ultrasonic transducer in the apparatus for controlling microorganisms according to the present invention.

According to the configuration of the apparatus 1, the ultrasonic transducer 5a is installed within the indirect tank 4, and dissolved gases in water within the indirect tank 4 are controlled by the dissolved-gas-controlling means 6, and thus resonant ultrasonic oscillation is stably generated. However, it is sufficient for resonant ultrasonic waves to be transmitted to the food material 3. For example, as shown in FIG. 1, the food material 3 is irradiated with resonant ultrasonic waves transmitted via the walls of the indirect tank 4 and the basal plate of the treatment tank 2 with the use of: a system through which the ultrasonic transducer is connected to an external part of the indirect tank (e.g., a basal plate part of the indirect tank 4) as in the case of an ultrasonic transducer 5b; or a throw-in ultrasonic transducer system that can be fitted to the bottom part, any tank wall surface parts, or the like of the treatment tank as in the case of the ultrasonic transducer 5a. Alternatively, as shown in FIG. 2, a sterilizing solution may be subjected to direct oscillation of resonant ultrasonic waves by installing an ultrasonic transducer 5c on a basal plate part of the treatment tank 2 or installing an ultrasonic transducer 5d within the treatment tank 2, while the dissolved-gas-controlling means 6 is used to control the concentration of dissolved gases in a sterilizing solution.

Figure 3:
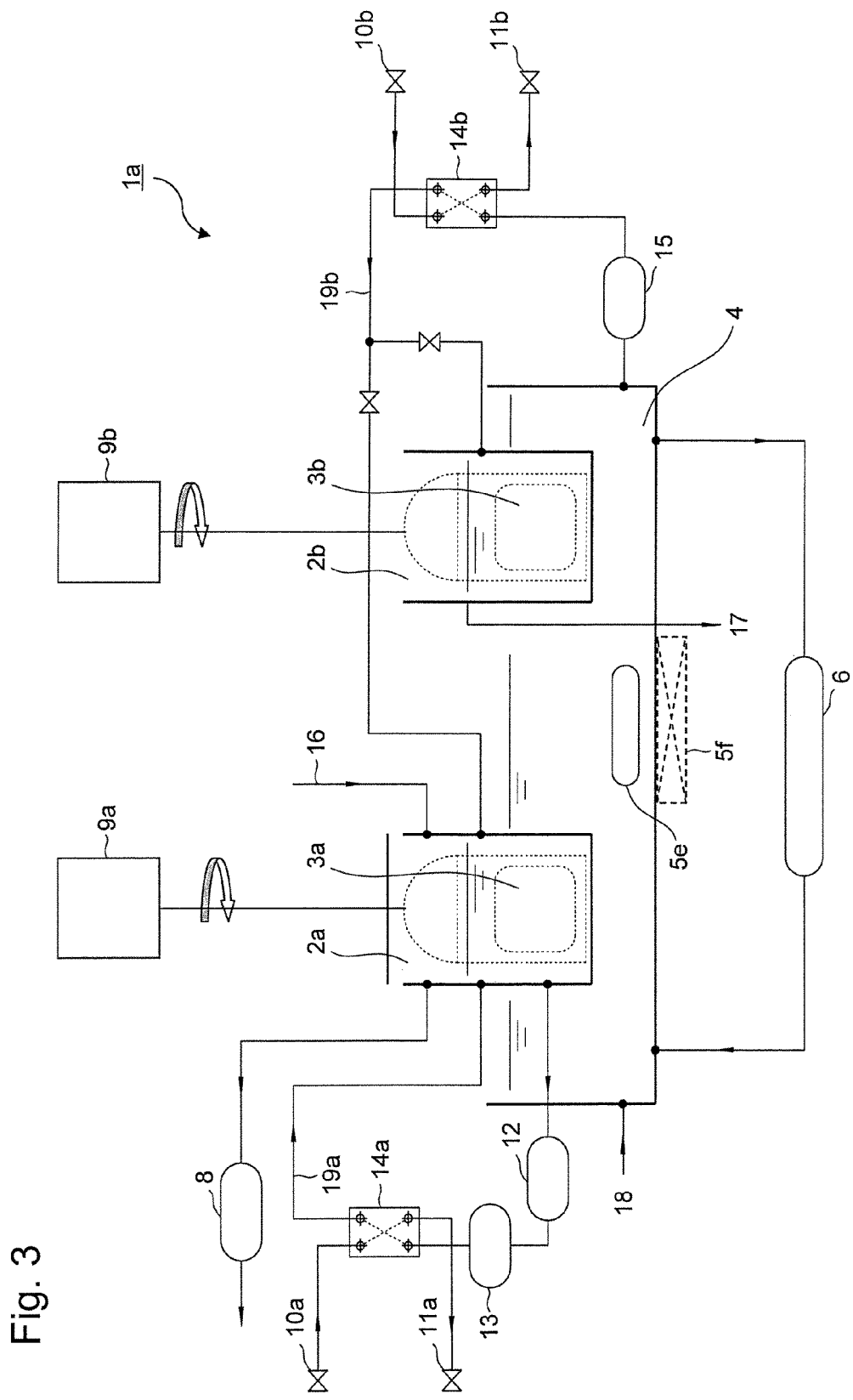
FIG. 3 is a schematic diagram showing an example of the configuration of the apparatus for controlling microorganisms according to the present invention.

FIG. 3 is a schematic diagram showing an example of the configuration of the apparatus. As shown in FIG. 3, the apparatus 1a comprises treatment tanks 2a and 2b for accommodating food materials 3a and 3b, respectively, an indirect tank 4 in which the treatment tanks 2a and 2b and an ultrasonic transducer 5e are disposed, and a dissolved-gas-controlling means 6 for controlling dissolved gases in solutions within the treatment tanks 2a and 2b and the indirect tank 4. In addition, an ultrasonic transducer may be disposed in the external part of an indirect tank, such as a basal plate part of the indirect tank 4 as in the case of an ultrasonic transducer 5f.

In the apparatus 1a, a reduced-pressure-controlling means 8 for subjecting the food material 3a to repeated treatment with negative pressure and ordinary pressure can be connected to the treatment tank 2a.

Also, in the apparatus 1a, rotation treatment means 9a and 9b can be connected to food materials 3a and 3b (containers in which food materials are placed), respectively.

Heat exchange functions are exerted as follows. Tap water and the like are supplied from valves 10a and 10b via the inlets of heat exchangers 14a and 14b for heat exchange, and warmed tap water passes through the outlets of the heat exchangers 14a and 14b and is then discharged via 11a and 11b. When the treatment tanks 2a and 2b for treating a food material such as a carcass are small, the solution with the indirect tank 4 may be circulated within the indirect tank alone by a dissolved-gas-controlling means. When the treatment tanks 2a and 2b for treating a food material such as a carcass are large, the effects of dissolved gases are lowered and the effects of resonant ultrasonic waves may be decreased. In this case, the solution with the concentration of dissolved gases controlled at the indirect tank 4 is supplied to the treatment tanks 2a and 2b, so that stable effects of resonant ultrasonic waves can be obtained. Other reasons for the need of a heat exchanger are temperature increases within the treatment tanks 2a and 2b and boiling of food materials such as carcasses due to the effects of resonant ultrasonic waves. A desired measure to prevent such problems is to perform heat exchange using heat exchangers 14a and 14b while supplying dissolved-gas-controlling water from the indirect tank 4 to the treatment tanks 2a and 2b using a circulating pump 12 and a feed pump 15, so as to control the temperature of the solution, and then to supply the solution to the treatment tanks 2a and 2b via piping 19a and 19b. Also, upon resonant ultrasonication, a food material is rotated by the rotation treatment means 9a and 9b, so that boiling of food materials such as carcasses can be prevented.

Cleanliness within the treatment tank 2a can be maintained at a certain level because of circulatory filtration performed by a circulating pump 12 and a filter 13.

Also, in the treatment tank 2b, a certain amount of dissolved-gas-controlling water is continuously supplied and discharged (water discharge passage 17), so that the cleanliness within the tank can be kept at a certain level and the solution temperature can be stabilized.

Meanwhile, in the indirect tank 4, dissolved gases in the solution within the tank are controlled by a dissolved-gas-controlling means 6 and thus can be kept at a certain level. Also, in the indirect tank 4, a certain amount of water (tap water) is continuously supplied from the following water introduction passage 18 and discharged, so that the cleanliness within the tank can be kept at a certain level and the amount of dissolved-gas-controlling water required for the treatment tank can be secured.

In addition, dissolved-gas-controlling water to be supplied is maintained at a more stable temperature (e.g., 20° C. to 30° C.) by the above heat exchanger. The temperature within the treatment tank is maintained at a constant level using dissolved-gas-controlling water, so that sterilizing effects due to the method used for a food material can be stabilized.

A sterilizing solution introduction passage 16 is a flow passage for supplying a sterilizing solution to the treatment tank 2a.

The water discharge passage 17 is a flow passage for discharging water within the treatment tank 2b.

The water introduction passage 18 is a flow passage for supplying water to the indirect tank 4.

The above method can be performed using the apparatus configured as described above. The method that is performed using the apparatus 1a shown in FIG. 3 is as described below.

First, a food material 3a is placed within the treatment tank 2a, and then a sterilizing solution is supplied from the sterilizing solution introduction passage 16. Furthermore, dissolved-gas-controlling water is supplied to the treatment tank 2a via a feed pump 15. Also, the dissolved-gas-controlling means 6 is activated for about 15 minutes to 20 minutes, for example, while supplying water (tap water) from the water introduction passage 18 to the indirect tank 4 to a predetermined level, so as to control dissolved gases in the solution. After dissolved gases in the solution within the indirect tank 4 are stabilized, water to be supplied from the water introduction passage 18 is continuously supplied and discharged at a constant level. The concentration of dissolved gases in dissolved-gas-controlling water is controlled at 2.5 mg/l or more and preferably within the range between 2.5 mg/l and 3.5 mg/l by a dissolved-gas-controlling means, so as to maintain the resonant ultrasonic wave pressure in a state with low attenuation and to stably transmit resonant ultrasonic waves.

Next, when repeated treatment with negative pressure and ordinary pressure is performed simultaneously with or before resonant ultrasonication, pressure is controlled by a reduced-pressure-controlling means 8 to perform pressure reduction and pressure recovery and thus the food material 3a is subjected to repeated treatment with negative pressure and ordinary pressure.

Subsequently, the food material 3a is subjected to resonant ultrasonication. Specifically, the food material 3a is irradiated with resonant ultrasonic waves by the ultrasonic transducer 5e disposed within the indirect tank 4 via an ultrasonic generator (diagrammatic representation is omitted). Resonant ultrasonic waves irradiated within the indirect tank 4 are transmitted through the walls of the treatment tank 2a, so that the food material 3a is irradiated with the resonant ultrasonic waves. At this time, when a food material is a poultry "carcass," for example, the carcass is rotated by a rotation treatment means (rotation mechanism) 9a, so that boiling of the carcass can be prevented and the carcass can be uniformly irradiated with resonant ultrasonic waves.

As described above, the food material 3a can be subjected to the method in the treatment tank 2a.

Meanwhile, also in the treatment tank 2b, a food material 3b can be similarly subjected to resonant ultrasonication. At this time, dissolved-gas-controlling water is supplied to the treatment tank 2b via the feed pump 15, and it is continuously supplied and discharged at a constant level. That is, the water can also be discharged from the water discharge passage 17.

In the apparatus 1a shown in FIG. 3, two treatment tanks are disposed, but one or three or more treatment tanks can also be disposed. For example, a plurality of treatment tanks are disposed and a plurality of food materials can be simultaneously subjected to the method in the apparatus.

Also, through arrangement of three treatment tanks, for example, a $1^{st}$ treatment tank can be used as a tank for repeated treatment with negative pressure and ordinary pressure, a $2^{nd}$ treatment tank can be used as a tank for resonant ultrasonication, and a $3^{rd}$ treatment tank can be used as a rinse tank for washing a food material subjected to the method. At this time, the food material may be transported by an automatic transport robot from the $1^{st}$ treatment tank to the $2^{nd}$ treatment tank and from the $2^{nd}$ treatment tank to the $3^{rd}$ treatment tank.

In the apparatus, the number of ultrasonic transducers can be reduced (for example, two ultrasonic transducers per three treatment tanks) with the use of the dissolved-gas-controlling means and the indirect tank although each treatment tank conventionally needs one ultrasonic transducer.

Furthermore, the apparatus comprises an ultrasonic wave output control means (e.g., Amplitude Modulation: AM) with the function of causing an ultrasonic generator to regulate the intensity of the output, and thus to uniformly subject a food material such as meat to processing according to the method. Specifically, it is also effective for: controlling the output of ultrasonic waves at intervals of 60 seconds; performing on-off control such that the output is turned on for about 60 seconds and the output is turned off for several seconds; or causing the output (100 w) of an ultrasonic generator for 1 sec, lowering the output to 50 W, and then applying ultrasonic waves for 1 sec.

The present invention will be specifically described in the following examples. However, the examples are not intended to limit the technical scope of the present invention.

Example 1

Control of Microorganisms in Broiler Chicken Carcasses by the Method

1. Methods and Materials

Broiler chicken carcasses (after defeathering and evisceration) that had been processed at a poultry slaughterhouse were used. Back skin and breast skin (5 cm×5 cm) were collected before predetermined treatment, and then a test was conducted for *Campylobacter*.

A chicken carcass was immersed in a predetermined sterilizing solution within a vacuum vessel and then negative pressure (0.002 MPa) was created inside the vessel using a suction apparatus. After the resultant was left to stand for 10 minutes, ordinary pressure was recovered. Treatment with negative pressure and ordinary pressure was repeated 3 times.

Subsequently, the carcass immersed in the sterilizing solution was subjected while intact to resonant ultrasonication under predetermined conditions, followed by 5 minutes of washing.

After resonant ultrasonication, the carcass was washed with running tap water.

After washing with running tap water, skin samples (5×5 cm) were collected from 6 sites of each carcass (inner wing, outer wing, inner thigh, outer thigh, breast, and back). Also, back skin and breast skin (10 g each) of carcasses were collected.

In addition, the above method was performed using three carcasses under each set of sterilization conditions.

2. Qualitative Test and Quantitative Test for *Campylobacter* in Chicken Carcasses 2-1. Qualitative Test for *Campylobacter*

Preston medium (45 ml) was added to 5×5 cm skin samples collected from the 6 sites of each carcass and then the skin samples were subjected to Stomacher treatment. Stomacher treatment is pretreatment for a microorganism test for extracting microorganisms from a sample, by which a specimen is mixed with dilution solution by machine processing for suspension, following which positive pressurization and negative pressurization are repeated using the shearing force of water to extrude and extract microorganisms from the sample.

After 48 hours of microaerophilic culture at 37° C. (culture conditions: under mixed gases; 85% $N_2$, 10% $CO_2$, and 5% $O_2$), 10 µl of the culture product was inoculated onto a mCCDA medium, followed by 48 hours of microaerophilic culture again.

After culture, *Campylobacter* was identified based on colony shape, Gram staining, PCR, and the like, and thus the numbers of *Campylobacter* which were detected from skin samples collected from 6 sites per carcass were determined.

2-2. Quantitative Test for *Campylobacter*

Preston medium (90 ml) was added to 10 g of a collected back or breast skin sample of a carcass and then the resultant was subjected to Stomacher treatment. Subsequently, 10 ml, 1 ml, and 0.1 ml of the Stomacher treatment solution were dispensed into test tubes (3 test tubes each; 9 test tubes in total). Preston medium was added to a test tube into which 1 ml or 0.1 ml of the Stomacher treatment solution had been dispensed to a total volume of 10 ml.

Next, after 48 hours of microaerophilic culture in test tubes, 10 µl of the solution was collected from each test tube and inoculated onto a mCCDA medium, following which it was subjected to 48 hours of microaerophilic culture again.

After culture, *Campylobacter* was identified based on colony shape, Gram staining, PCR, and the like, and then the number of bacteria per 1 gram was calculated. The number of *Campylobacter* was calculated by a MPN (most probable number) method. The MPN method is a method for statistically expressing the number of bacteria after culture as a probability. The number of *Campylobacter* is denoted by "x," the number of test tubes is denoted by "n," and the number of test tubes in which *Campylobacter* is detected is denoted by "p." These figures are statistically processed to find the most probable value for "x" from "n" and "p." "n=3" was employed for the number of test tubes and determination was made using 10-fold-, 100-fold-, and 1000-fold-diluted specimens (subjected to 3 serial dilutions).

3. Effects of Sterilization Treatment Methods and Disinfectants Used Herein on the Effect of Sterilizing *Campylobacter* (Qualitative Test 1)

Sterilizing effects on chicken carcasses exerted by different sterilization treatment methods and disinfectants were qualitatively compared.

The disinfectant used herein was cetylpyridinium chloride (CPC) or hypochlorite. In addition, as a negative control, sterilization treatment in tap water was also performed. When cetylpyridinium chloride was used, the concentration was 1000 ppm. On the other hand, when hypochlorite was used, the concentration was 100 ppm.

Also, resonant ultrasonication was performed using resonant ultrasonic waves having a frequency of 28 KHz.

FIG. 4 shows the results. Values shown in FIG. 4 are the average numbers for detection sites (where *Campylobacter* was detected) when 3 carcasses were used for each sterilization treatment. Also, "no treatment" indicates the result for a sample for which immersion in a sterilizing solution, suction treatment, and resonant ultrasonication were not performed.

As shown in FIG. 4, *Campylobacter* was detected from all the 6 tested sites (breast, back, inner thigh, outer thigh, inner wing, and outer wing) in the case of a combination of suction treatment and resonant ultrasonication (28 KHz) where no disinfectant had been used ("tap water" and "no treatment"). On the other hand, the number of detection sites was found to decrease to about 2 in the case of treatment using cetylpyridinium chloride (CPC), and the same was found to decrease to about 3 in the case of treatment using hypochlorite.

In the case of resonant ultrasonication (28 KHz) alone, whereas treatment using cetylpyridinium chloride (CPC) resulted in exertion of a sterilizing effect to the same extent as that in the case in which suction treatment was also used, treatment using hypochlorite resulted in a low sterilizing effect.

4. Effects of Sterilization Treatment Methods and Disinfectants Used Herein on the Effect of Sterilizing *Campylobacter* (Quantitative Test 1)

Sterilizing effects that differ depending on sterilization treatment methods and disinfectants for chicken carcasses were quantitatively compared.

Disinfectants used herein, the concentrations thereof, and resonant ultrasonication conditions were the same as those in the above qualitative test 1.

Figure 5:
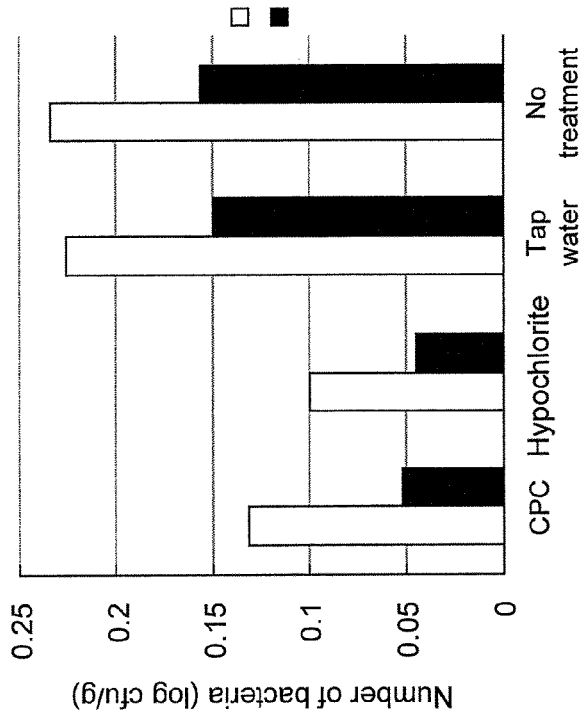
FIG. 5 shows graphs showing the results of a quantitative test concerning the effects of sterilization treatment methods and disinfectants used herein on the effect of sterilizing *Campylobacter* in broilers (A: combination of suction treatment resonant ultrasonic waves; B: use of resonant ultrasonic waves alone).

FIG. 5 shows the results. Values shown in FIG. 5 are the average numbers of detected bacteria when 3 carcasses were used for each sterilization treatment. Also, "no treatment"

indicates the result of a sample for which immersion in a sterilizing solution, suction treatment, and resonant ultrasonication were not performed.

As shown in FIG. 5, in the cases of the combination of suction treatment and resonant ultrasonication (28 KHz) and treatment with resonant ultrasonic waves (28 KHz) alone, the number of *Campylobacter* adhering to the back and breast skin was found to decrease from about one-tenth to one-hundredth the number of *Campylobacter* before treatment (untreated sample). The combination of suction treatment and resonant ultrasonication exerted a higher sterilizing effect than treatment with resonant ultrasonic waves alone. Also, treatment using cetylpyridinium chloride (CPC) exerted a higher sterilizing effect than treatment using hypochlorite.

5. Effects of Sterilization Treatment Methods and Disinfectants Used Herein on the Effect of Sterilizing *Campylobacter* (Qualitative Test 2)

Sterilizing effects that differ depending on sterilization treatment methods and disinfectants on chicken carcasses were qualitatively compared.

Disinfectants used herein and the concentrations thereof were the same as those in the above qualitative test 1. Meanwhile, resonant ultrasonication was performed using resonant ultrasonic waves having a frequency of 130 KHz.

FIG. 6 shows the results. Values shown in FIG. 6 are the average numbers of detection sites (where *Campylobacter* was detected) when 3 carcasses were used for each sterilization treatment. Also, "no treatment" indicates the result of a sample for which immersion in a sterilizing solution, suction treatment, and resonant ultrasonication were not performed.

As shown in FIG. 6, *Campylobacter* was detected from all the tested 6 sites (breast, back, inner thigh, outer thigh, inner wing, and outer wing) in the case of the combination of suction treatment and resonant ultrasonication (130 KHz) where no disinfectant had been used ("tap water" and "no treatment"). On the other hand, the number of detection sites was found to decrease to about 2 or less in the case of treatment using cetylpyridinium chloride (CPC) and the same was found to decrease to about 3 in the case of treatment using hypochlorite.

In the case of resonant ultrasonication (130 KHz) alone, whereas treatment using cetylpyridinium chloride (CPC) resulted in exertion of a sterilizing effect to the same extent as that in the case in which suction treatment was also used, treatment using hypochlorite resulted in a low sterilizing effect.

6. Effects of Sterilization Treatment Methods and Disinfectants Used Herein on the Effect of Sterilizing *Campylobacter* (Quantitative Test 2)

Sterilizing effects that differ depending on sterilization treatment methods and disinfectants for chicken carcasses were quantitatively compared.

Disinfectants used herein, the concentrations thereof, and resonant ultrasonication conditions were the same as those in the above qualitative test 2.

Figure 7:
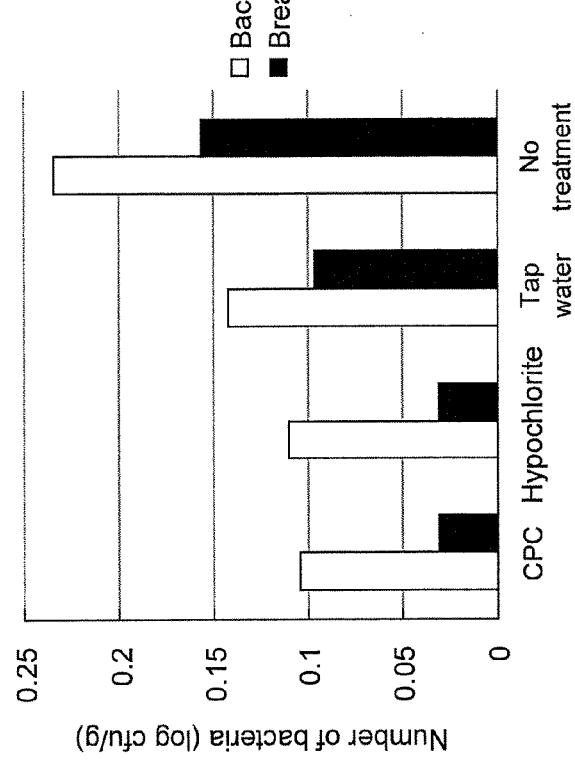
FIG. 7 shows graphs showing the results of a quantitative test concerning the effects of sterilization treatment methods and disinfectants used herein on the effect of sterilizing *Campylobacter* in broilers (A: use of resonant ultrasonic waves alone; B: combination of suction treatment resonant ultrasonic waves).

FIG. 7 shows the results. Values shown in FIG. 7 are the average numbers of detected bacteria when 3 carcasses were used for each sterilization treatment. Also, "no treatment" indicates the result of a sample for which immersion in a sterilizing solution, suction treatment, and resonant ultrasonication were not performed.

As shown in FIG. 7, in the cases of the combination of suction treatment and resonant ultrasonication (130 KHz) and the treatment with resonant ultrasonic waves (130 KHz) alone, the number of *Campylobacter* adhering to the back and breast skin was found to decrease to about one-tenth to one-hundredth the number of *Campylobacter* before treatment (untreated sample). The combination of suction treatment and resonant ultrasonication exerted the sterilizing effect higher than that in the case of treatment with resonant ultrasonic waves alone. Also, treatment using cetylpyridinium chloride (CPC) exerted the sterilizing effect higher than that exerted by treatment using hypochlorite.

7. Sterilizing Effect on Chicken Skin Surface (Scanning Electron Microscopic Observation)

Sterilizing effects on chicken skin surfaces were evaluated by scanning electron microscopic observation.

Chicken skin used herein was the breast skin surface of a broiler after defeathering.

A disinfectant used herein and the concentration thereof were cetylpyridinium chloride (CPC) and 1000 ppm, respectively. Also, resonant ultrasonication was performed using resonant ultrasonic waves having a frequency of 130 KHz. In addition, sterilization treatment was performed via a combination of suction treatment and resonant ultrasonication.

Figure 8:
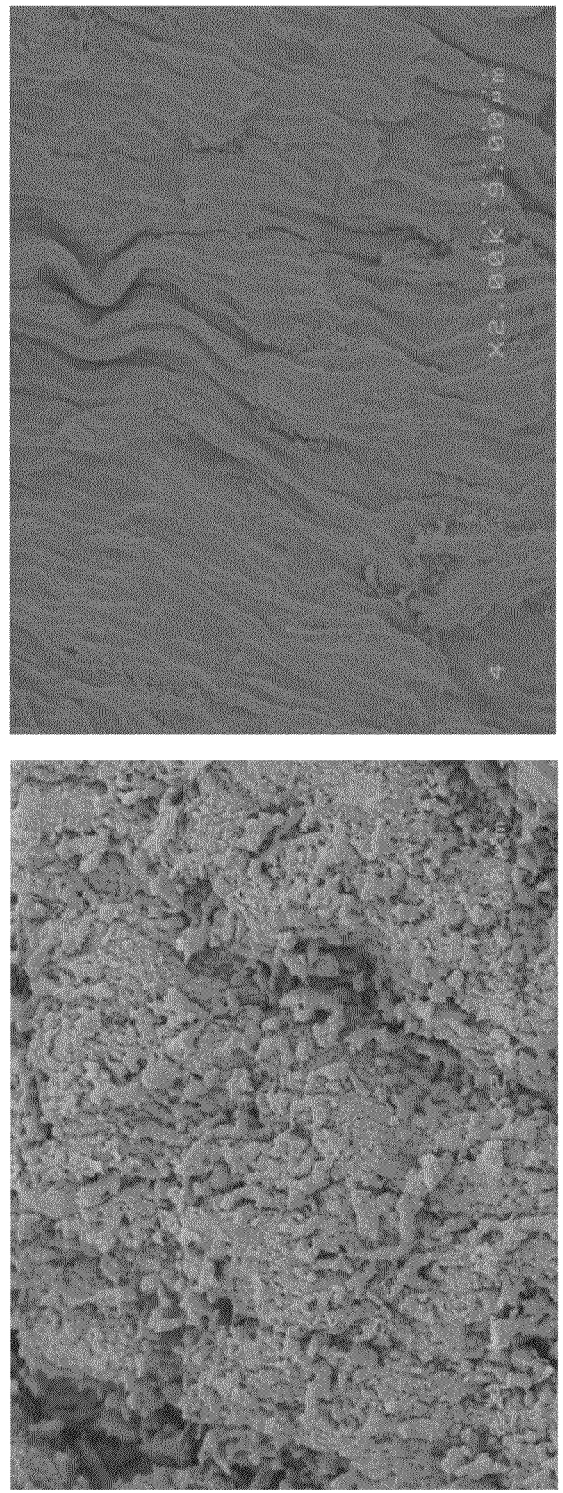
FIG. 8 shows scanning electron microscopic photographs of broiler chicken skin subjected to sterilization treatment by the method for controlling microorganisms in a food material according to the present invention.

FIG. 8 shows the results. In FIG. 8, the image of "before treatment" is a scanning electron microscopic image showing the chicken skin before sterilization treatment and the image of "after treatment" is a scanning electron microscopic image showing the chicken skin after sterilization treatment.

As shown in FIG. 8, many bacteria were found to adhere in the form of a membrane to the chicken skin surface before sterilization treatment; however, almost no adherent bacteria were observed on the chicken skin surface after sterilization treatment, to such an extent that the original skin surface could also be observed.

Example 2

Control of Microorganisms for Local Chicken Carcasses by the Method

1. Methods and Materials

Local chicken carcasses (after defeathering and evisceration) that had been processed at a poultry slaughterhouse were subjected to predetermined sterilization treatment. Sterilization treatment was performed in Example 2 as follows: "suction treatment" alone, "resonant ultrasonication" alone, or "suction treatment" followed by "resonant ultrasonication." "Suction treatment" was performed under predetermined negative pressure in a manner similar to that used in Example 1. Also, "resonant ultrasonication" was performed using resonant ultrasonic waves having a frequency of 38 KHz in a manner similar to that used in Example 1.

After predetermined sterilization treatment, a carcass (after defeathering and evisceration) was washed with running water for 30 minutes (10 minutes×3) while undergoing resonant ultrasonication (100 KHz). After washing, skin samples (5×5 cm) were collected from 6 sites (back, breast, inner thigh, outer thigh, inner wing, and outer wing) of a carcass (after defeathering and evisceration).

The effect of sterilizing *Campylobacter* was examined by a qualitative test for *Campylobacter* described in Example 1 using the thus obtained skin samples.

In addition, examination was performed using three carcasses for each set of sterilization conditions.

2. Effects of Suction Treatment Alone on the Effect of Sterilizing *Campylobacter*

To examine sterilizing effects on *Campylobacter*, which differ depending on suction treatment methods (suction intensity and suction frequency), *Campylobacter* was detected at the 6 skin sites of a "carcass" after each suction treatment (suction treatment alone) using cetylpyridinium chloride (CPC) (1000 ppm).

Figure 9:
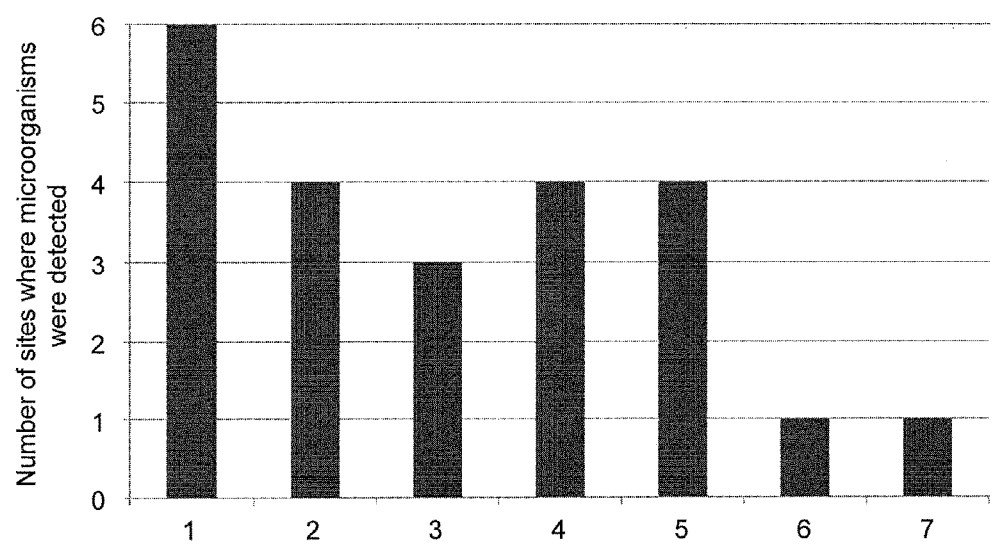
FIG. 9 is a graph showing the results of a qualitative test concerning the effects of suction treatment alone on the effect of sterilizing *Campylobacter* in local chickens.

FIG. 9 shows the results. The vertical axis indicates the number of detection sites (where *Campylobacter* was detected) of the 6 skin sites of a "carcass", and the horizontal axis indicates each sample. Treatment was performed for each sample under the following suction treatment conditions:
1: no treatment, 2: negative pressure (0.02 MPa)+frequency (10 minutes×2), 3: negative pressure (0.02 MPa)+frequency (10 minutes×3), 4: negative pressure (0.06 MPa)+frequency (10 minutes×2), 5: negative pressure (0.06 MPa)+frequency (10 minutes×3), 6: negative pressure (0.002 MPa)+frequency (10 minutes×2), and 7: negative pressure (0.002 MPa)+frequency (10 minutes×3). Values represent the average numbers of detection sites when 3 carcasses were used for each sterilization treatment. Also, "no treatment" indicates the result of a sample for which immersion in a sterilizing solution, suction treatment, and resonant ultrasonication were not performed.

As shown in FIG. 9, whereas *Campylobacter* was detected at all 6 sites when no sterilization treatment had been performed (no treatment), the detection rate decreased along with increases in the intensity of the negative pressure for the suction treatment and suction frequency. In particular, when suction treatment had been performed 2 or 3 times under negative pressure of 0.002 MPa, *Campylobacter* was detected at only one site.

3. Effects of Combination of Suction Treatment and Resonant Ultrasonication on the Effect of Sterilizing *Campylobacter*

To examine the effect of sterilizing *Campylobacter* exerted by the combination of suction treatment and resonant ultrasonication, detection of *Campylobacter* was performed for the 6 skin sites of a "carcass" after each sterilization treatment using cetylpyridinium chloride (CPC) (1000 ppm).

Figure 10:
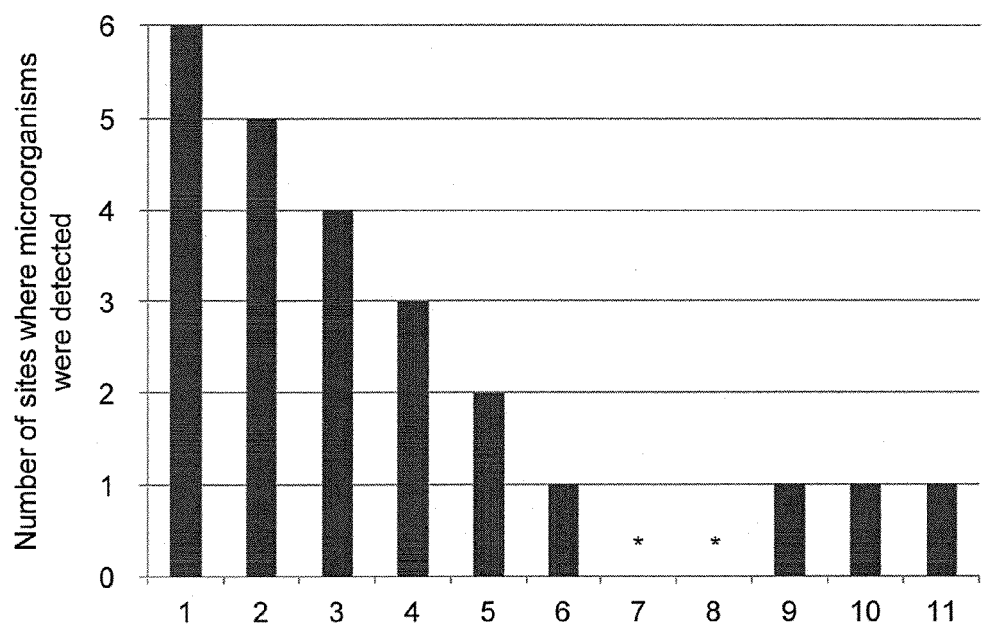
FIG. 10 is a graph showing the results of a qualitative test concerning the effects of a combination of suction treatment and resonant ultrasonication on the effect of sterilizing *Campylobacter* in local chickens.

FIG. 10 shows the results. The vertical axis indicates the number of detection sites (where *Campylobacter* was detected) out of the 6 skin sites of a "carcass" and the horizontal axis indicates each sample. Each sample was treated under the following sterilization treatment conditions:
1: no treatment, 2: treatment with resonant ultrasonic waves alone (30 minutes), 3: suction treatment (negative pressure (0.02 MPa)+frequency (10 minutes×1))+resonant ultrasonication (30 minutes), 4: suction treatment (negative pressure (0.02 MPa)+frequency (10 minutes×2))+resonant ultrasonication (30 minutes), 5: suction treatment (negative pressure (0.02 MPa)+frequency (10 minutes×3))+resonant ultrasonication (30 minutes), 6: suction treatment (negative pressure (0.06 MPa)+frequency (10 minutes×1))+resonant ultrasonication (30 minutes), 7: suction treatment (negative pressure (0.06 MPa)+frequency (10 minutes×2))+resonant ultrasonication (30 minutes), 8: suction treatment (negative pressure (0.06 MPa)+frequency (10 minutes×3))+resonant ultrasonication (30 minutes), 9: suction treatment (negative pressure (0.002 MPa)+frequency (10 minutes×1))+resonant ultrasonication (30 minutes), 10: suction treatment (negative pressure (0.002 MPa)+frequency (10 minutes×2))+resonant ultrasonication (30 minutes), and 11: suction treatment (negative pressure (0.002 MPa)+frequency (10 minutes×3))+resonant ultrasonication (30 minutes). Values were the average numbers of detection sites, when 3 carcasses were used for each sterilization treatment. Also, "no treatment" indicates the result of a sample for which immersion in a sterilizing solution, suction treatment, and resonant ultrasonication were not performed. Furthermore, "*" indicates complete lack of *Campylobacter* detection at any of the sites.

As shown in FIG. 10, *Campylobacter* was detected at all 6 sites when no sterilization treatment had been performed (no treatment), and *Campylobacter* was detected at 5 sites when treatment with resonant ultrasonic waves alone had been performed. On the other hand, when the intensity of negative pressure for suction treatment and suction frequency were increased due to a combination with resonant ultrasonication, the detection rate decreased. In particular, when resonant ultrasonication had been performed after 2 or more times of suction treatment under negative pressure of 0.06 MPa, a high sterilizing effect could be obtained.

Example 3

Control of Microorganisms for Broiler and Local Chicken Carcasses by the Method using Rotation Treatment 1. Materials and Methods Broiler and local chicken carcasses (after defeathering and evisceration) that had been processed at a poultry slaughterhouse were used. About 10 g of back skin and about 10 g of breast skin on the left side of a carcass were collected (3 sites per back or breast) before predetermined treatment.

Subsequently, the carcass was immersed in a sterilizing solution (cetylpyridinium chloride (CPC) (1000 ppm) or hypochlorite (100 ppm)). Negative pressure (0.002 MPa) was created within the solution using a suction apparatus. After the resultant had been left to stand for 10 minutes, ordinary pressure was recovered. Treatment with negative pressure and ordinary pressure was repeated 3 times. Also, as controls, an experiment involving 30 minutes of immersion alone in a sterilizing solution and an experiment involving suction (3 times) alone were also conducted.

Moreover the carcass was immersed in a stainless steel container filled with a sterilizing solution (cetylpyridinium chloride (CPC) (1000 ppm) or hypochlorite (100 ppm)). The carcass was then subjected to 5 minutes of resonant ultrasonication while left to stand or 15 minutes of resonant ultrasonication while it was rotated at 30 rotations per minute. Also, as a control, a carcass was immersed in tap water and then subjected to resonant ultrasonication for 15 minutes while it was rotated at 30 rotations per minute using a rotation apparatus.

After each treatment, a carcass was washed with running tap water for 10 minutes and then about 10 g of back skin and about 10 g of breast skin on the right side of the carcass were collected (3 sites per back or breast).

2. Quantitative Test for *Campylobacter* in Broiler and Local Chicken Carcasses

Ninety (90) ml of Preston medium was added to the each skin collected before and after treatments, and then the resultants were subjected to Stomacher treatment.

Next, according to the method described in Example 1, the number of bacteria per 10 g of skin was calculated by a MPN (most probable number) method and then a quantitative test was conducted for *Campylobacter* (detection limit: 3 cfu/10 g). Here, cfu (colony forming unit) represents the number of bacterial colonies.

3. Effects of Sterilization Treatment Methods and Disinfectants Used Herein on the Effect of Sterilizing *Campylobacter* (Quantitative Test)

Figure 11:
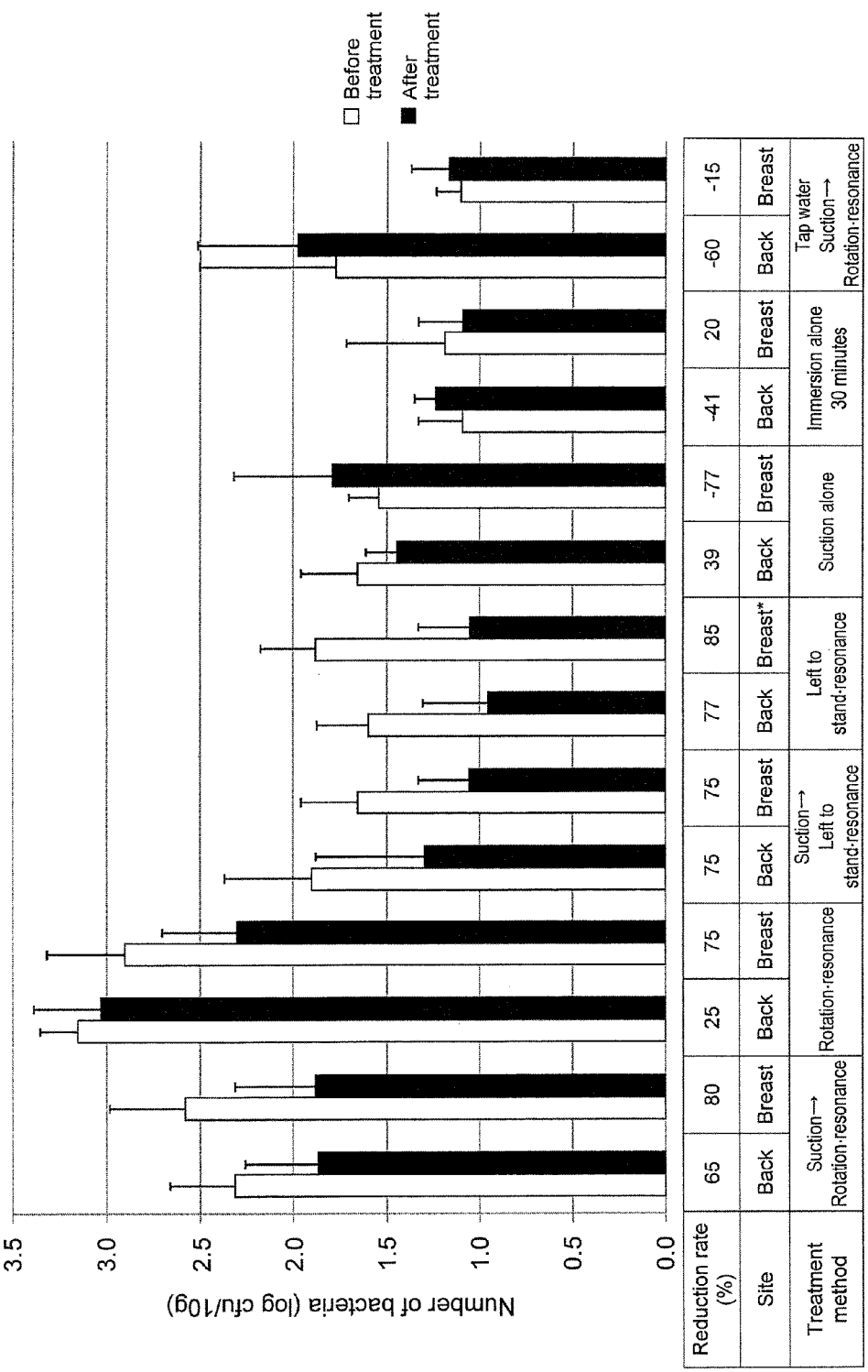
FIG. 11 is a graph showing the results of a quantitative test concerning the effects of sterilization treatment methods and a disinfectant (hypochlorite) on the effect of sterilizing *Campylobacter* in broilers.
Figure 12:
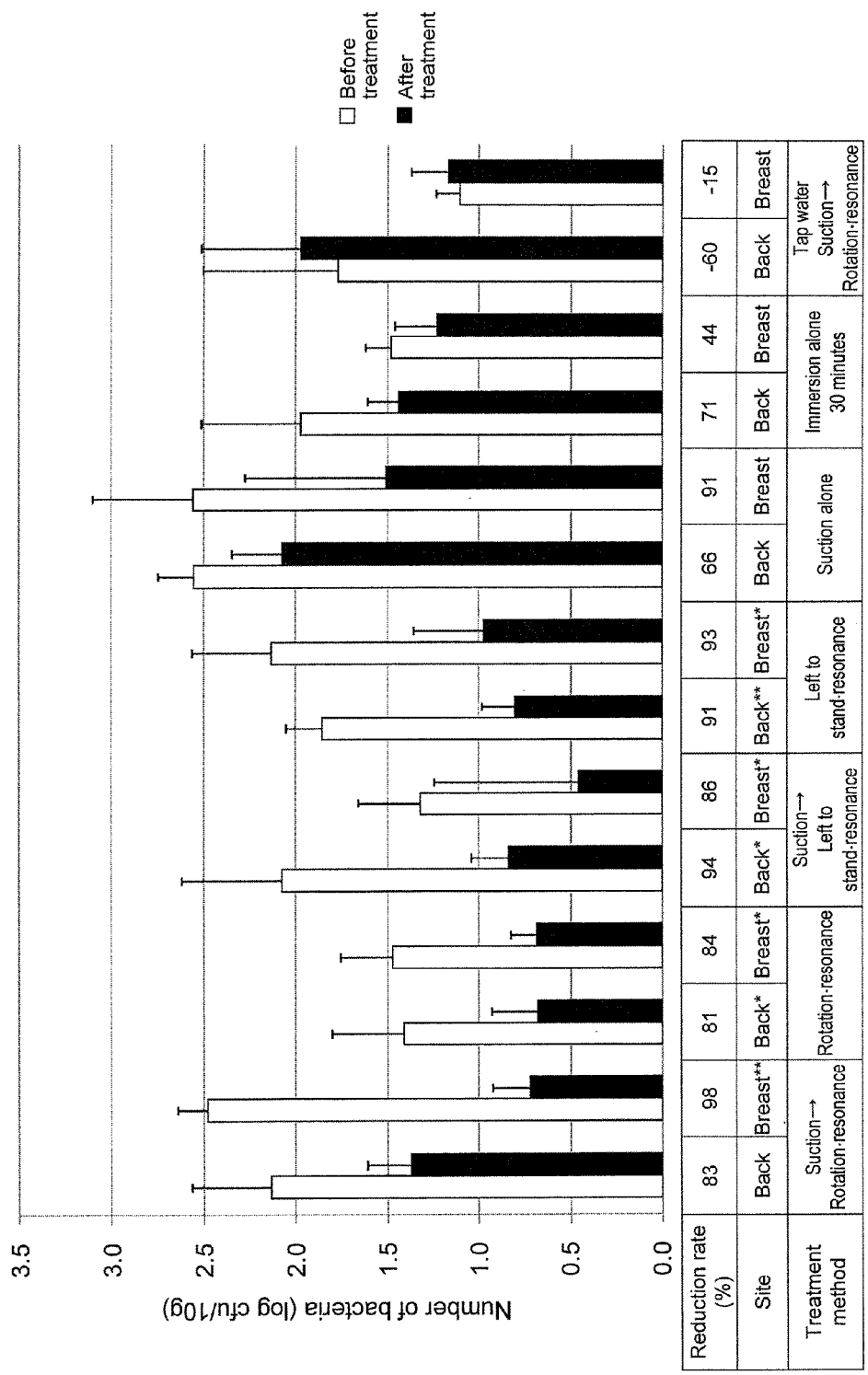
FIG. 12 is a graph showing the results of a quantitative test concerning the effects of sterilization treatment methods and a disinfectant (cetylpyridinium chloride (CPC)) on the effect of sterilizing *Campylobacter* in broilers.
Figure 13:
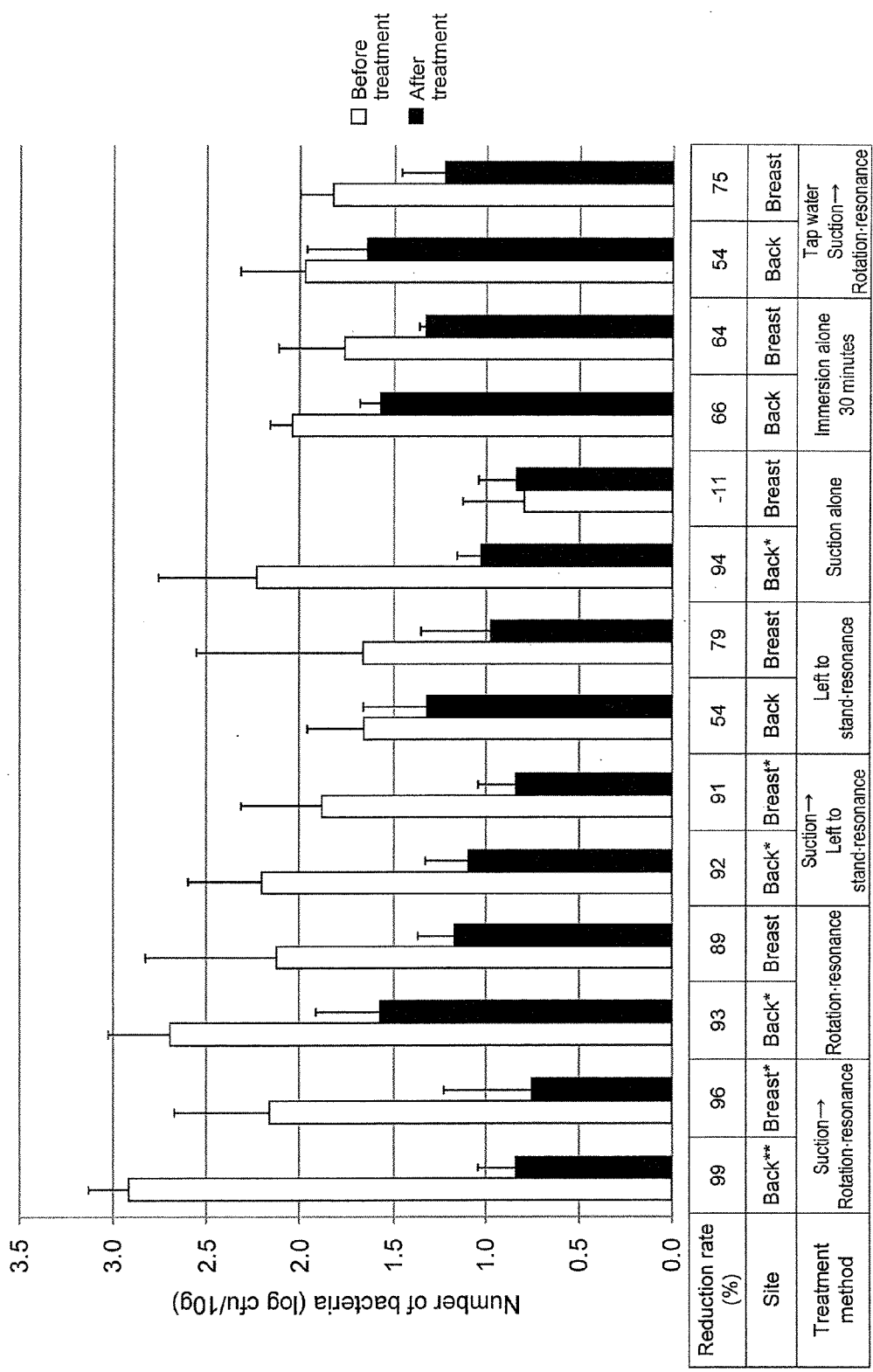
FIG. 13 is a graph showing the results of a quantitative test concerning the effects of sterilization treatment methods and a disinfectant (hypochlorite) on the effect of sterilizing *Campylobacter* in local chickens.
Figure 14:
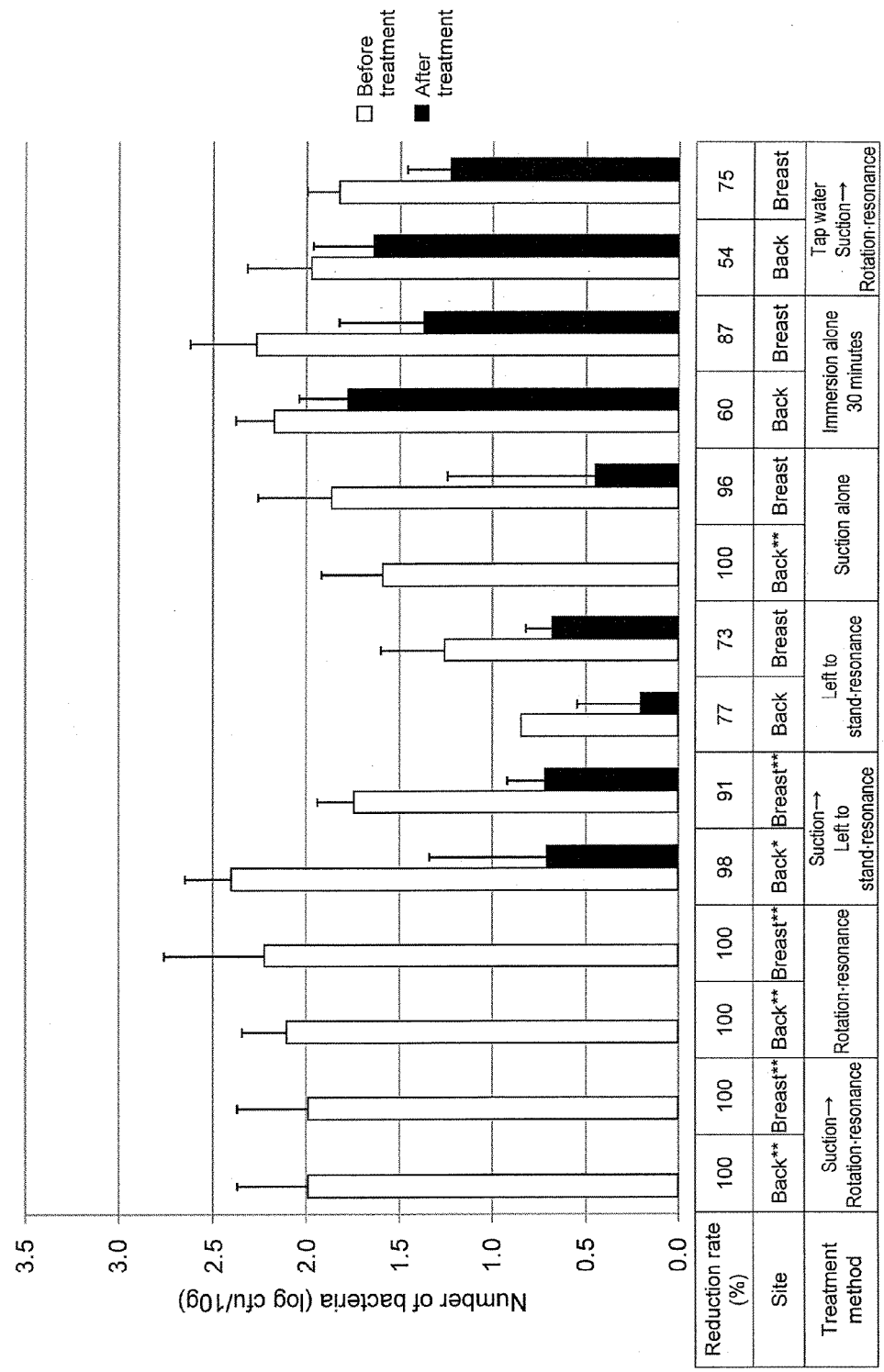
FIG. 14 is a graph showing the results of a quantitative test concerning the effects of sterilization treatment methods and a disinfectant (cetylpyridinium chloride (CPC)) on the effect of sterilizing *Campylobacter* in local chickens.

FIG. 11 to FIG. 14 show the results. FIG. 11 is a graph showing the results of a quantitative test concerning the effects of sterilization treatment methods and a disinfectant (hypochlorite) on the effect of sterilizing *Campylobacter* in broilers. FIG. 12 is a graph showing the results of a quantitative test concerning the effects of sterilization treatment methods and a disinfectant (cetylpyridinium chloride (CPC)) on the effect of sterilizing *Campylobacter* in broilers. FIG. 13 is a graph showing the results of a quantitative test concerning the effects of sterilization treatment methods and a disinfectant (hypochlorite) on the effect of sterilizing *Campylobacter* in local chickens. FIG. 14 is a graph showing the results of a quantitative test concerning the effects of sterilization treatment methods and a disinfectant (cetylpyridinium chloride (CPC)) on the effect of sterilizing *Campylobacter* in local chickens.

In FIG. 11 to FIG. 14, each treatment method is as follows: "suction": suction (10 minutes×3); "rotation": 30 rotations/minute; "Left to stand-resonance": 5 minutes of resonant ultrasonication while left to stand; and "rotation-resonance": 15 minutes of resonant ultrasonication during rotation. Also in FIG. 11 to FIG. 14, "*" and "**" indicate P<0.05 and P<0.01, respectively, in a significant difference test (t-test).

As shown in FIG. 11 and FIG. 12, when cetylpyridinium chloride (CPC) (1000 ppm) had been used for broilers, significant decreases were observed in the number of bacteria (to about 1/10 to 1/100 the level of an untreated case) with the combination of suction treatment and resonant ultrasonication.

Also, as shown in FIG. 13 and FIG. 14, when hypochlorite (100 ppm) had been used for local chickens, significant decreases were observed in the numbers of bacteria with the combination of suction treatment and resonant ultrasonication (to about 1/10 to 1/100 the level of the untreated case). It was demonstrated that the sterilizing effect tended to increase with further use of a rotation apparatus in combination. When cetylpyridinium chloride (CPC) (1000 ppm) had been used, a sterilizing effect higher than that of hypochlorite was observed. Through a combination of rotation treatment and resonant ultrasonication or a case in which suction treatment was also used, *Campylobacter* could be reduced to the detection limit or less (1/100 the level of an untreated case).

Example 4

Control of Microorganisms in Broiler and Local Chicken Carcasses by the Method using Kinkorosu Water Solution as a Sterilizing Solution 1. Materials and Methods Broiler and local chicken carcasses (after defeathering and evisceration) that had been processed at a poultry slaughterhouse were used. About 10 g of back skin and about 10 g of breast skin from the left side of a carcass were collected (3 sites per back or breast) before predetermined treatment.

Next, a carcass was immersed in a sterilizing solution (4% Kinkorosu Water solution) and then negative pressure (0.002 MPa) was created within the solution using a suction apparatus. After the resultant had been left to stand for 10 minutes, ordinary pressure was recovered. Treatment with negative pressure and ordinary pressure was repeated 3 times.

Subsequently, the carcass was immersed in a stainless steel container filled with a sterilizing solution (4% Kinkorosu Water solution) and then subjected to resonant ultrasonication for 15 minutes while it was rotated at 30 rotations per minute using a rotation apparatus.

After resonant ultrasonication, the carcass was washed with running tap water for 10 minutes and then about 10 g of back skin and about 10 g of breast skin from the right side of the carcass were collected (3 sites per back or breast).

2. Quantitative Test for *Campylobacter* in Broiler and Local Chicken Carcasses

Ninety (90) ml of Preston medium was added to the each skin collected before and after treatments and then the resultants were subjected to Stomacher treatment.

Next, according to the method described in Example 1, the number of bacteria per 10 g of skin was calculated by a MPN (most probable number) method and then a quantitative test was conducted for *Campylobacter* (detection limit: 3 cfu/10 g).

3. Effects of Kinkorosu Water Solution on the Effect of Sterilizing *Campylobacter* (Quantitative Test)

Figure 15:
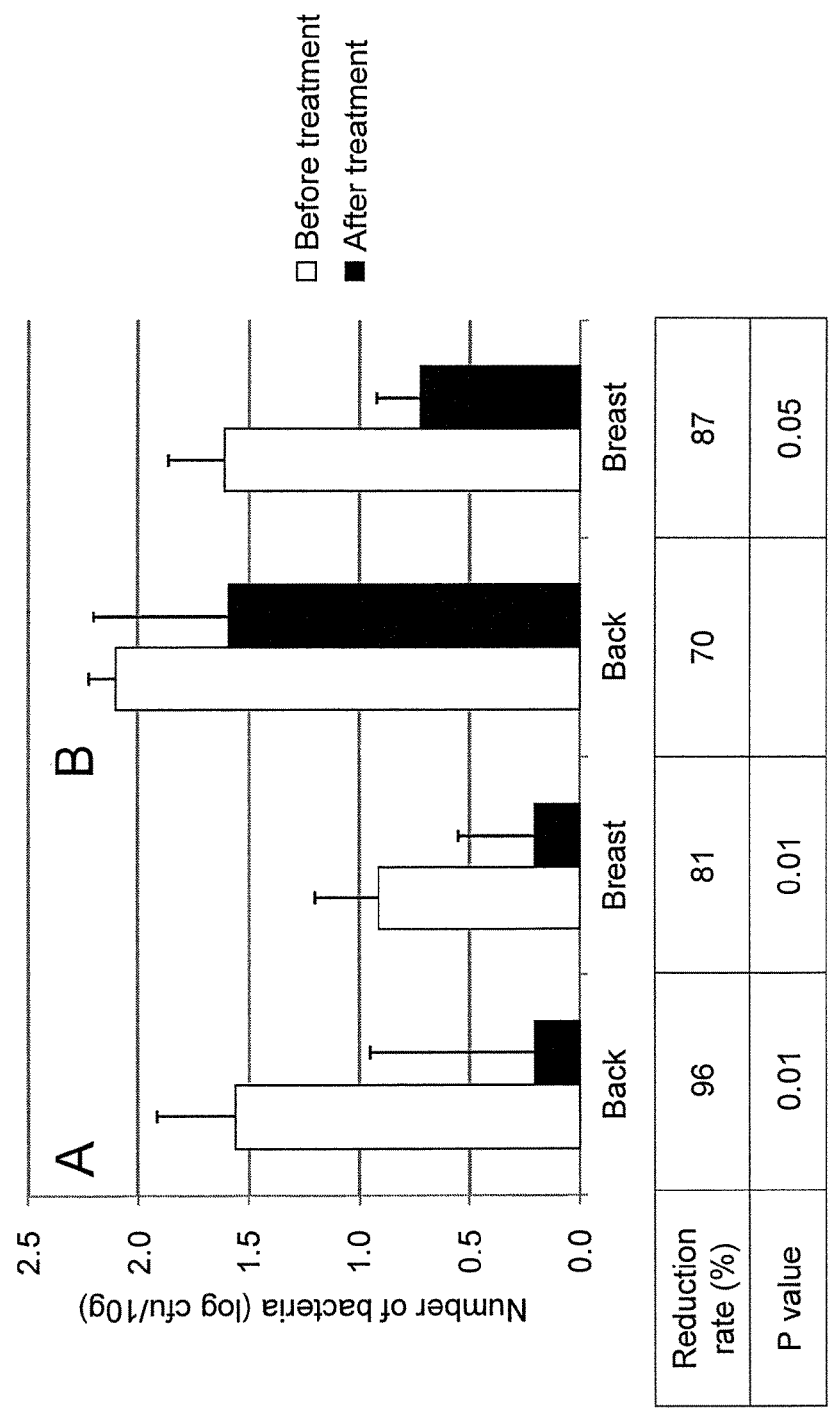
FIG. 15 is a graph showing the results of a quantitative test concerning the effects of Kinkorosu Water on the effect of sterilizing *Campylobacter* in a local chicken and a broiler (A: local chicken; B: broiler).

FIG. 15 shows the results. FIG. 15 is a graph showing the results of a quantitative test concerning the effects of Kinkorosu Water solution on the effect of sterilizing *Campylobacter* in a local chicken and a broiler (A: local chicken; B: broiler).

As shown in FIG. 15, it was revealed that the Kinkorosu Water solution had a high degree of effectiveness in sterilizing *Campylobacter* adhering to the local chicken carcass.

INDUSTRIAL APPLICABILITY

According to the present invention, bacterial groups that cause deterioration of the quality of food materials such as poultry and pathogenic microorganisms that cause food poisoning can be efficiently controlled.

When poultry is used as a food material in the present invention, the number of bacteria adhering to poultry (and in particular, major microorganisms causing food poisoning, such as *Campylobacter*) can be reduced to about up to one-hundredth the original bacterial count.

DESCRIPTION OF SYMBOLS 1, 1a: Apparatus for controlling microorganisms in a food material according to the present invention
2, 2a, 2b: Treatment tank
3, 3a, 3b: Food materials
4: Indirect tank
5a-5f: Ultrasonic transducer
6: Dissolved-gas-controlling means
7: Ultrasonic generator
8: Reduced-pressure-controlling means
9, 9a, 9b: Rotation treatment means
10a, 10b: Cooling water introduction passage
11a, 11b: Cooling water discharge passage
12: Circulating pump
13: Filter
14a, 14b: Heat exchanger
15: Feed pump
16: Sterilizing solution introduction passage
17: Water discharge passage
18: Water introduction passage
19a, 19b: Piping All publications, patents, and patent applications cited herein are incorporated herein by reference in their entirety.

The invention claimed is:

1. An apparatus for controlling microorganisms in a food material, comprising:
   at least one treatment tank for subjecting a food material immersed in a sterilizing solution to treatment;
   an indirect tank in which a treatment tank is disposed;
   a dissolved-gas-controlling means for controlling dissolved gases in solutions within the treatment tank and the indirect tank; and,
   a means for subjecting the food material immersed in the sterilizing solution to resonant ultrasonication,
   wherein the food material is subjected to resonant ultrasonication under control of dissolved gases using the dissolved-gas-controlling means.

2. The apparatus according to claim 1 comprising a reduced-pressure-controlling means, wherein the food material is subjected to repeated treatment with negative pressure and ordinary pressure.

3. The apparatus according to claim 1, further comprising a means for subjecting the food material immersed in the sterilizing solution to rotation treatment, wherein the food material is subjected to resonant ultrasonication while the food material is rotated.

4. The apparatus according to claim 1, comprising a means for controlling the output of ultrasonic waves.

5. The apparatus according to claim 1, wherein the food material is meat.

6. The apparatus according to claim 5, wherein the meat is poultry.

* * * * *